US012791811B2

(12) United States Patent
Gu et al.

(10) Patent No.: US 12,791,811 B2

(45) Date of Patent: Nov. 10, 2026

(54) OPTICAL FIBER TERMINAL BOX WITH HIGH SEALING PERFORMANCE

(71) Applicant: ACCELIGHT TECHNOLOGIES (WUHAN) CO., LTD., Wuhan (CN)

(72) Inventors: Gong-En Gu, Wuhan (CN); Matthew John Steven Rouleau, Wuhan (CN); Neil Santos, Wuhan (CN); William Sterling, Wuhan (CN); Hengzhi Fan, Wuhan (CN); Wenbing Zhu, Wuhan (CN); Zhehuanyan Mei, Wuhan (CN); Fei Li, Wuhan (CN)

(73) Assignee: ACCELIGHT TECHNOLOGIES (WUHAN) CO., LTD., Wuhan (CN)

( * ) Notice: Subject to any disclaimer, the term of this patent is extended or adjusted under 35 U.S.C. 154(b) by 318 days.

(21) Appl. No.: 18/631,211

(22) Filed: Apr. 10, 2024

(65) Prior Publication Data

US 2024/0377601 A1 Nov. 14, 2024

Related U.S. Application Data

(63) Continuation of application No. PCT/CN2023/136777, filed on Dec. 6, 2023.

(30) Foreign Application Priority Data

May 12, 2023 (CN) ......................... 202310548280.9

(51) Int. Cl.

*G02B 6/44* (2006.01)

*G02B 6/36* (2006.01)

(52) U.S. Cl.

CPC ....... *G02B 6/44465* (2023.05); *G02B 6/3644* (2013.01)

(58) Field of Classification Search

CPC .................................................. G02B 6/44465

See application file for complete search history.

(56) References Cited

U.S. PATENT DOCUMENTS

2003/0123836 A1 * 7/2003 Fujisawa ................ G02B 6/245 385/137

FOREIGN PATENT DOCUMENTS

CN 201698061 U 1/2011

CN 204716501 U 10/2015

(Continued)

OTHER PUBLICATIONS

CN-217385911-U Clarivate translation (Year: 2022).*

(Continued)

*Primary Examiner* — Lisa M Caputo

(74) *Attorney, Agent, or Firm* — Troutman Pepper Locke LLP; Tim Tingkang Xia, Esq.

(57) ABSTRACT

The invention discloses an optical fiber terminal box comprising a box body, where mounting grooves are disposed on the box body, a threading block is plugged into the mounting groove having an open end provided with a threading block pressing plate, the threading block is provided with an optical fiber cabling hole, an outer circumferential surface of the threading block is provided with at least two first positioning grooves arranged along an axial direction of the optical fiber cabling hole, at least one second positioning groove is disposed on a groove bottom surface of at least one of the first positioning grooves, an inner circumferential surface of the mounting groove is provided with first positioning lug bosses, the first positioning lug bosses and the first positioning grooves are arranged in one-to-one correspondence, and at least one of the first positioning lug bosses is provided with a second positioning lug boss.

10 Claims, 14 Drawing Sheets

(56) References Cited

FOREIGN PATENT DOCUMENTS

| | | | | |
|---|---|---|---|---|
| CN | 206458577 | U | * | 9/2017 |
| CN | 207640255 | U | | 7/2018 |
| CN | 113448033 | A | | 9/2021 |
| CN | 217385911 | U | * | 9/2022 |
| CN | 217689545 | U | | 10/2022 |
| CN | 218213752 | U | | 1/2023 |
| CN | 116794780 | A | | 9/2023 |
| JP | H0953561 | A | | 2/1997 |
| WO | 2019075675 | A | | 4/2019 |

OTHER PUBLICATIONS

CN-206458577-U Clarivate translation (Year: 2017).*

International Search Report and Written Opinion issued by the China Intellectual Property Office for Application No. PCT/CN2023/136777, Mar. 18, 2024, China.

* cited by examiner

OPTICAL FIBER TERMINAL BOX WITH HIGH SEALING PERFORMANCE

CROSS-REFERENCE TO RELATED APPLICATIONS

This application is a continuation application of PCT Patent Application Serial No. PCT/CN2023/136777, filed Dec. 6, 2023, which itself claims priority to Chinese Patent Application No. 202310548280.9, filed May 12, 2023, which are hereby incorporated herein in their entireties by reference.

TECHNICAL FIELD

The present invention relates generally to the technical field of optical modules, and more particularly to an optical fiber terminal box with high sealing performance.

BACKGROUND

The main function of an optical fiber splice closure is to split an optical cable, which is a device for splitting the optical cable into individual optical fibers, and a user optical fiber splice closure is generally mounted on a wall, cable, or utility pole or in a sewer, and it plays a role in providing fusion-splicing between optical fibers, fusion-splicing between an optical fiber and a pigtail, and connection between optical connectors.

The optical fiber splice closure is mainly applicable to straight-through and branch connection of optical cables of various structures that are laid in a manner such as aerial laying, pipe laying, and directly-buried laying. The splice closure body is generally made of synthetic plastics, has high strength, corrosion resistance and water resistance, etc., and are widely applied to communication, network systems, CATV cable television and cable network systems, etc. The optical cable enters the optical fiber splice closure, and then an outer sheath and a reinforcing core thereof need to be mechanically fixed, a ground wire protection component is additionally mounted, end-head protection processing is performed, and the optical fibers are grouped and protected. The optical fiber splice closure has the following functions: a fusion-splicing function, in which after an optical fiber introduced from an optical cable and a tail cable are fusion-spliced, the excessive optical fiber is wound to be stored, and a fusion-splicing joint is protected; a deployment function, in which a connector attached to the tail cable is plugged into an adapter to achieve optical path butt-joint with an optical connector on the other side of the adapter; and a storage function for providing storage for optical connection wires of various cross connections between racks, so that they can be placed regularly and tidily.

The description of Chinese utility model patent CN 217385911 U discloses an optical fiber terminal box, comprising a box body, and a first threading plate disposed on the box body, the first threading plate is provided with a plurality of layers of first stripping wires, the plurality of layers of first stripping wires are distributed in a concentric circle, and selectively along one of the first stripping wires, a plate body in the first stripping wire is stripped to form a first mounting hole for an optical cable to pass through. Although the structural design improves the universality of the optical fiber terminal box, the following defects still exist: a connection structure between the threading plate and a mounting groove of the box body cannot effectively meet the requirements of IP65 of the product in an optical communication industry, i.e., meet the requirements of dust sealing (completely preventing foreign matters and dust from entering) and prevent the entry of sprayed water (preventing water sprayed from nozzles in various directions from entering the product and causing damage).

In view of the above disadvantages, there is an urgent need to design an optical fiber splice closure that can meet the requirements of dust sealing of the box body (completely preventing foreign matters and dust from entering) and preventing the entry of sprayed water (preventing water sprayed from nozzles in various directions from entering the product and causing damage).

SUMMARY

The technical problem to be solved by the present invention is to provide an optical fiber terminal box with high sealing performance in view of the defects in the prior art.

The technical solution used by the present invention to solve the technical problem thereof is that:

the present invention provides an optical fiber terminal box with high sealing performance, comprising a box body, where mounting grooves are disposed on the box body, a threading block is plugged into the mounting groove in a cooperating manner, an open end of the mounting groove is provided with a threading block pressing plate, and the threading block is provided with an optical fiber cabling hole, where an outer circumferential surface of the threading block is provided with at least two first positioning grooves arranged at intervals along an axial direction of the optical fiber cabling hole, at least one second positioning groove is disposed on a groove bottom surface of at least one of the first positioning grooves, an inner circumferential surface of the mounting groove is provided with first positioning lug bosses, the first positioning lug bosses and the first positioning grooves are arranged in one-to-one correspondence, and at least one of the first positioning lug bosses is provided with a second positioning lug boss cooperating with the second positioning groove.

In a preferred embodiment of the present invention, the threading block is a multi-layer step structure, and the threading block comprises a first step, a second step, a third step, and a fourth step that are sequentially arranged along the axial direction of the optical fiber cabling hole, a width of the first step is greater than a width of the second step, the width of the second step is less than a width of the third step, the width of the third step is greater than a width of the fourth step, the second step and the fourth step are both provided with the first positioning grooves, and the first positioning groove located on the second step is provided with the second positioning groove. The width of each step is defined as that a projection of each step in a horizontal plane comprises two edges parallel to a central axis of the optical fiber cabling hole, and a distance between the two edges is the width of each step.

In a preferred embodiment of the present invention, the first positioning grooves and the first positioning lug bosses are in interference fit, and the second positioning lug bosses and the second positioning grooves are in clearance fit.

In a preferred embodiment of the present invention, the threading block is an integrally formed rubber plug, and an end surface of one side of the threading block is provided with a notch feature for forming the optical fiber cabling hole.

In a preferred embodiment of the present invention, the optical fiber cabling hole is a tapered hole.

In a preferred embodiment of the present invention, a plug is detachably disposed in the optical fiber cabling hole, and a shape of the plug corresponds to a shape of the optical fiber cabling hole.

In a preferred embodiment of the present invention, the box body comprises a main base plate and a box cover, the main base plate is provided with the mounting grooves, the box cover is connected to the main base plate through lock catches, and an optical fiber storage tray is hinged in the main base plate through optical fiber storage tray fixing brackets.

In a preferred embodiment of the present invention, the optical fiber storage tray fixing bracket comprises a supporting seat, the supporting seat is provided with a rotating shaft mounting inner hole, an inner circumferential surface of the rotating shaft mounting inner hole is provided with a plurality of first stopping ribs rotationally symmetrically disposed along a circumferential direction thereof and inwardly extending in a radial direction thereof, the optical fiber storage tray is provided with rotating shafts, an outer circumferential surface of the rotating shaft is provided with a plurality of second stopping ribs rotationally symmetrically disposed along a circumferential direction thereof and outwardly extending in a radial direction thereof, an outer diameter of the second stopping rib is less than a hole diameter of the rotating shaft mounting inner hole, and a diameter of a circle tangent to the second stopping rib is greater than a diameter of a circle tangent to the first stopping rib.

In a preferred embodiment of the present invention, the rotating shaft mounting inner hole is provided with an opening groove extending along an axis thereof and penetrating in a radial direction.

In a preferred embodiment of the present invention, a back plate is provided on the box body, where the back plate comprises a first plate body portion and a second plate body portion that are parallelly arranged at intervals, the first plate body portion is transitionally connected to the second plate body portion through a bending portion, a wall-hanging mounting through is disposed on the first plate portion, and a box body mounting and fixing through hole is disposed on the second plate portion.

In a preferred embodiment of the present invention, rectangular holes are disposed on the first plate body portion, and the rectangular holes are connected to hose clamps.

In a preferred embodiment of the present invention, a hanging wire is connected to the rectangular hole, the hanging wire comprises an L-shaped body portion, the body portion is provided with a zigzag-shaped hole and a bend parallelly arranged at intervals with respect to the zigzag-shaped hole, and the distance between the bend and the body portion corresponds to a thickness of the first plate body portion, an L-shaped pressing block is connected to the zigzag-shaped hole in a cooperating manner, the bend is plugged to one of the rectangular holes, one end of the L-shaped pressing block passes through the zigzag-shaped hole and the other rectangular hole, and the other end of the L-shaped pressing block is fixedly connected to the back plate through a screw.

The present invention further discloses an optical fiber network distribution system, comprising a branch optical fiber, a household optical fiber, and an optical fiber terminal box with high sealing performance, where the branch optical fiber is connected to the household optical fiber through the optical fiber terminal box.

Beneficial effects of the present invention are as follows:

1. In the present invention, a concave-convex structure design of the threading block and the mounting groove enables the threading block and the mounting groove to be matched to ensure that the threading block can be completely attached to the mounting groove without any gap, and the main base plate can be completely isolated from the outside, therefore, the optical fiber terminal box with high sealing performance meets the requirements of IP65 of an optical communication industry, i.e., meeting the requirements of dust sealing (completely preventing foreign matters and dust from entering) and preventing the entry of sprayed water (preventing water sprayed from nozzles in various directions from entering the product and causing damage).

2. In the present invention, by ensuring that the first positioning grooves and the first positioning lug bosses are in interference fit, and the second positioning lug bosses and the second positioning grooves are in clearance fit, deformation caused when the first positioning grooves and the first positioning lug bosses are cooperated can be compensated by the clearance fit between the second positioning lug bosses and the second positioning grooves, thereby effectively preventing water sprayed from nozzles in various directions from entering the product and causing damage.

3. In the present invention, the threading block is an integrally formed rubber plug, an end surface of one side of the threading block is provided with a notch feature for forming the optical fiber cabling hole, and the optical fiber cabling hole is a tapered hole. When the threading block is not in use, the optical fiber cabling hole is in a closed state, so that a box body can be in a sealed state. When the threading block needs to be used, a sharp tool such as a knife needs to be used to cut along the notch feature to form the optical fiber cabling hole. After the optical cable that can be withstood by the rubber plug is placed in the optical fiber cabling hole (a diameter between the largest diameter and the smallest diameter of the tapered hole can be withstood), the optical cable can be wrapped tightly. The rubber material is relatively soft, and this property enables the smaller end of the tapered hole of the rubber plug to wrap the optical cable, and enables a gap to be filled based on the deformation of the rubber plug.

4. In the present invention, the box body comprises a main base plate and a box cover, the main base plate is provided with the mounting grooves, the box cover is connected to the main base plate through lock catches, an optical fiber storage tray is hinged in the main base plate through optical fiber storage tray fixing brackets, the optical fiber storage tray fixing bracket comprises a supporting seat, the supporting seat is provided with a rotating shaft mounting inner hole, an inner circumferential surface of the rotating shaft mounting inner hole is provided with a plurality of first stopping ribs rotationally symmetrically disposed along a circumferential direction thereof and inwardly extending in a radial direction thereof, the optical fiber storage tray is provided with a rotating shaft, an outer circumferential surface of the rotating shaft is provided with a plurality of second stopping ribs rotationally symmetrically disposed along a circumferential direction thereof and outwardly extending in a radial direction thereof, an outer diameter of the second stopping rib is less than a hole diameter of the rotating shaft mounting inner hole, and a diameter of a circle tangent to the second stopping rib is greater than a diameter of a circle tangent to the first stopping rib. This structural design can implement hovering of the optical fiber storage tray, and in addition, the fiber storage tray can be ensured to be used for a long time and not to fail.

5. In the present invention, the rotating shaft mounting inner hole is provided with an opening groove extending along an axis thereof and penetrating in a radial direction. This structural design improves the service life of the present invention based on the rigidity and the plasticity of the plastics material.

BRIEF DESCRIPTION OF DRAWINGS

The following further describes the present invention with reference to the accompanying drawings and embodiments, in which.

DETAILED DESCRIPTION OF THE EMBODIMENTS

To make objectives, technical solutions, and advantages of the present invention more clearly, the following further describes the present invention in detail with reference to the accompanying drawings and embodiments. It should be understood that the specific embodiments described herein are merely intended to explain the present invention, but not to limit the present invention.

Embodiment 1

Figure 1:
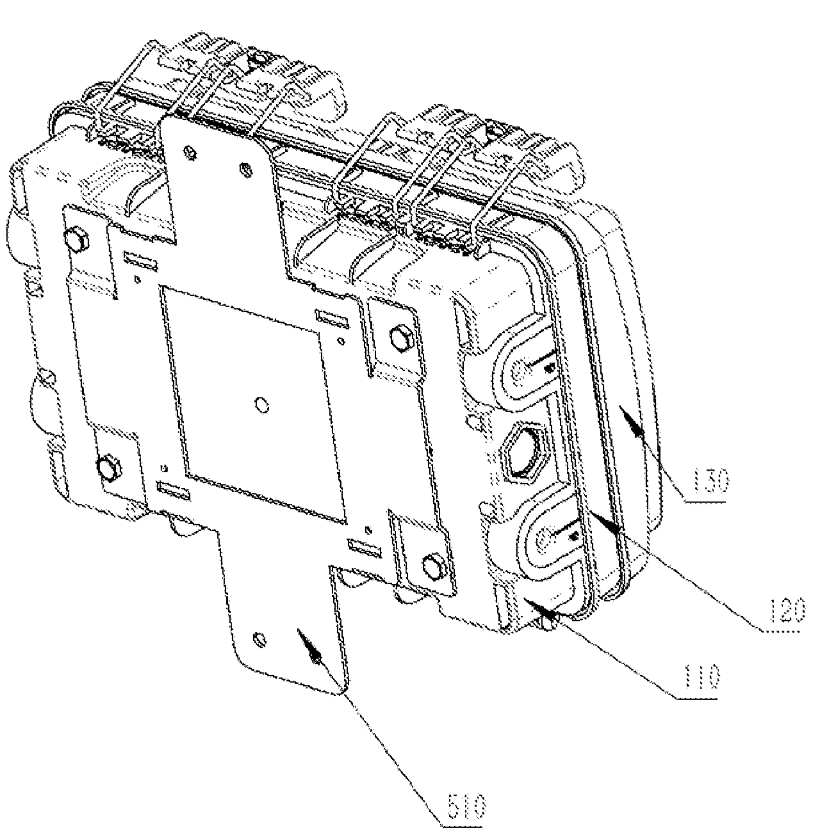
FIG. 1 is a structural diagram of an optical fiber terminal box with high sealing performance according to an embodiment of the present invention.
Figure 2:
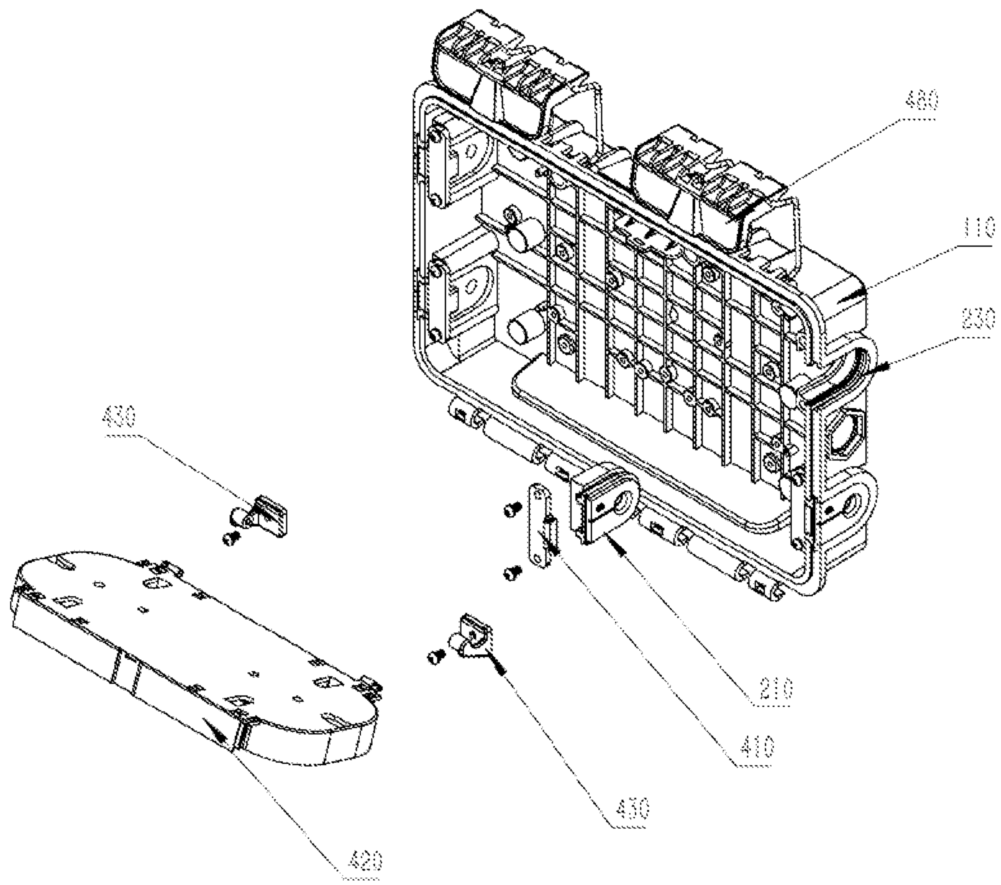
FIG. 2 is an exploded view of an optical fiber terminal box with high sealing performance according to an embodiment of the present invention.
Figure 3:
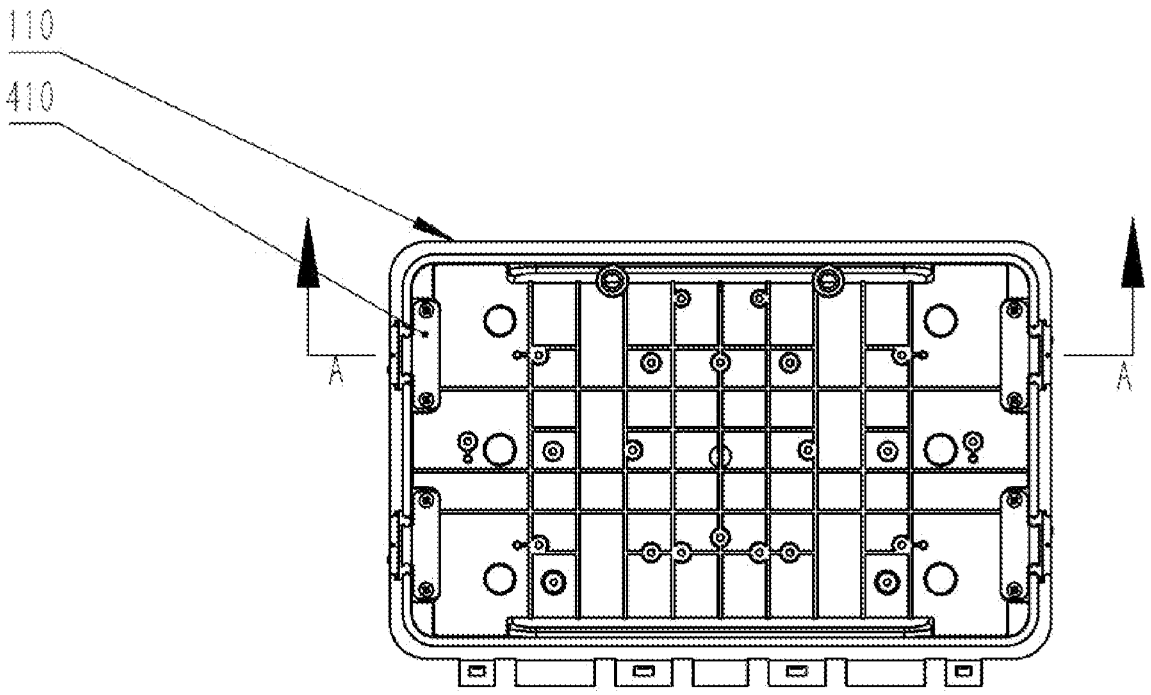
FIG. 3 is a schematic diagram of a main base plate of a box body according to an embodiment of the present invention.
Figure 4:
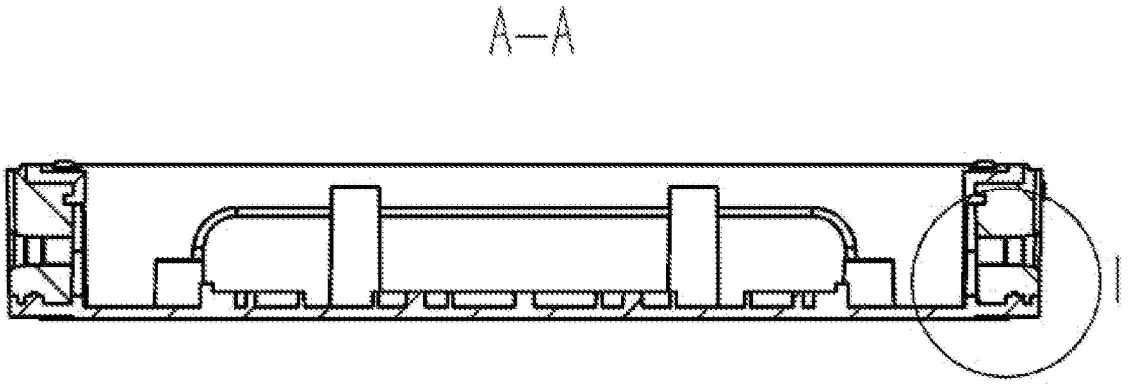
FIG. 4 is a sectional view of A-A in FIG. 3.
Figure 5:
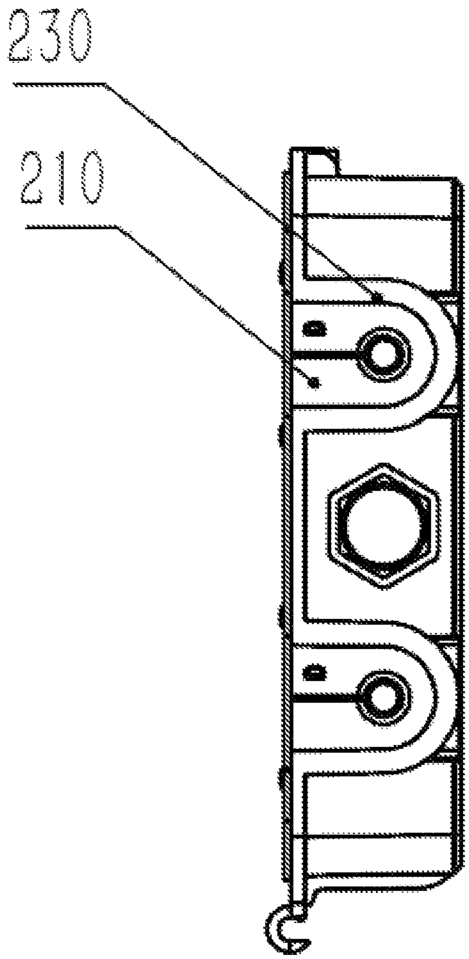
FIG. 5 is a side view of a main base plate of a box body according to an embodiment of the present invention.
Figure 6:
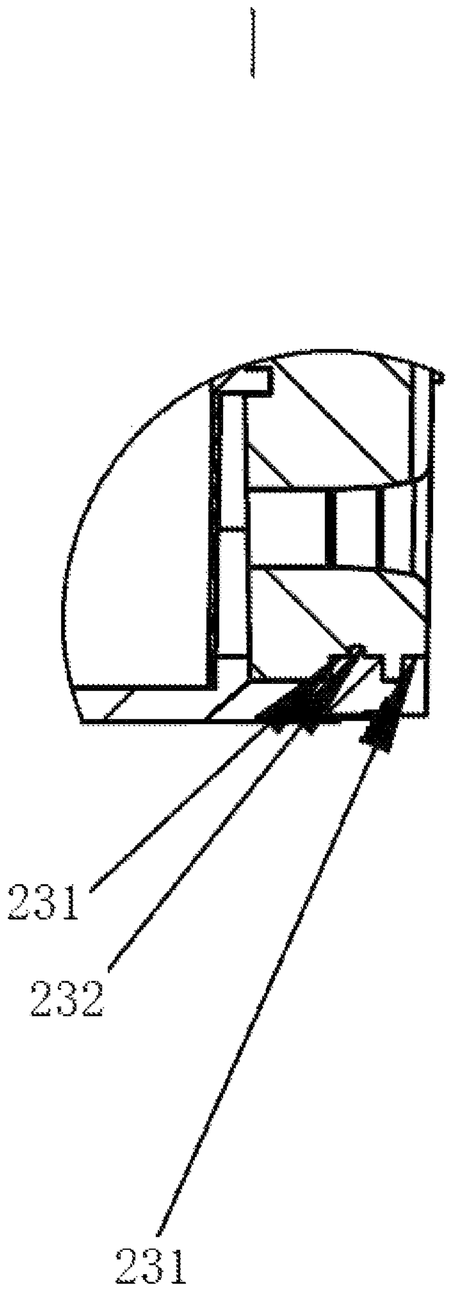
FIG. 6 is a partially enlarged view of I in FIG. 4.
Figure 7:
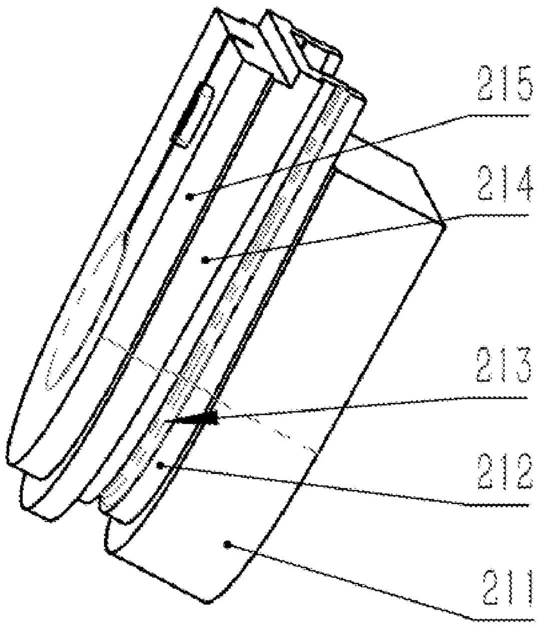
FIG. 7 is a structural diagram of a threading block according to an embodiment of the present invention.

As shown in FIG. 1, an optical fiber terminal box with high sealing performance of an embodiment of the present invention comprises three components: a main base plate 110, a middle layer 120, and a box cover 130, where the main base plate 110 and the box cover 130 are hinged through a hinge, and are closed through lock catches 480. A sealing ring is individually disposed between every two of the main base plate 110, the middle layer 120 and the box cover 130. After the lock catches 480 are locked, the three layers of the box are finally fixed together, and the sealing rings are squeezed and sealed. Since the sealing ring belongs to the prior art, details are not described herein again.

As shown in FIGS. 2 to 5, the main base plate 110 is a main structure of the embodiment of the present invention, and the main base plate 110 is a main part of the optical fiber terminal box with high sealing performance, which is mainly used for in and out and fixation of optical fibers, optical fiber storage of an optical cable, placement of an optical fiber fusion splice tray, and fixation of a mounting bracket when the optical fiber terminal box with high sealing performance is mounted with external parts. The main base plate 110 comprises the following structural components:

- mounting grooves 230 for mounting threading blocks 210;
- the threading blocks 210, formed in a one-off manner by using a rubber plug structure, used for entering and exiting of a main optical cable, and plugged into the mounting grooves 230;
- threading block pressing plates 410 for limiting the threading blocks 210 to prevent the threading blocks 210 from being pulled out;
- in addition, an optical fiber storage tray 420 being disposed in the main base plate 110 for placing a fusion-spliced optical cable and a heat shrink protection sleeve; and the optical fiber storage tray 420 being hinged in the main base plate 110 through optical fiber storage tray fixing brackets 430, and the optical fiber storage tray fixing brackets 430 being divided into left and right parts, one for each.

As shown in FIGS. 6 to 11, the core inventive point of the present invention lies in the structural design of the threading blocks 210. In the present invention, an outer circumferential surface of the threading block 210 is provided with at least two first positioning grooves 216 arranged at intervals along an axial direction of an optical fiber cabling hole 217, at least one second positioning groove 213 is disposed on a groove bottom surface of at least one of the first positioning grooves 216, an inner circumferential surface of the mounting groove 230 is provided with first positioning lug bosses 231, the first positioning lug bosses 231 and the first positioning grooves 216 are arranged in one-to-one correspondence, and at least one of the first positioning lug bosses 231 is provided with a second positioning lug boss 232 cooperating with the second positioning groove 213. In the present invention, the threading block 210 designed in the described structure not only realizes the accurate fixing of a position of the threading block 210, and in addition, sealing performance of the present invention is effectively ensured by the cooperation of the plurality of first positioning lug bosses and the first positioning grooves, so that the present invention can meet the requirements of IP65 of the product in an optical communication industry, i.e., meet the requirements of dust sealing (completely preventing foreign matters and dust from entering) and preventing the entry of sprayed water (preventing water sprayed from nozzles in various directions from entering the product and causing damage). Furthermore, the cooperation between the second positioning lug bosses and the second positioning grooves can ensure the accuracy of the cooperation between the first positioning lug bosses and the first positioning grooves. Particularly, when the first positioning grooves 216 and the first positioning lug bosses 231 are in interference fit, the clearance difference between the second positioning lug bosses 232 and the second positioning grooves 213 can provide certain deformation spaces for the first positioning grooves 216 and the first positioning lug bosses 231 to be deformed by pressing, thereby ensuring that the threading blocks 210 are accurately assembled in the mounting grooves 230 in a sealed manner. It can be understood that, in the present invention, the first positioning grooves 216, the second positioning grooves 213, the first positioning lug bosses 231 and the second positioning lug bosses 232 are all described from the perspective of product machining. For example, a base material with a semi-cylindrical shape may be selected as a raw material of the threading block 210, and a plurality of the first positioning grooves 216 are first formed on an outer peripheral surface of the base material by milling. Then, the second positioning groove 213 is formed at a bottom surface of any one or more of the first positioning grooves 216 by milling.

Figure 8:
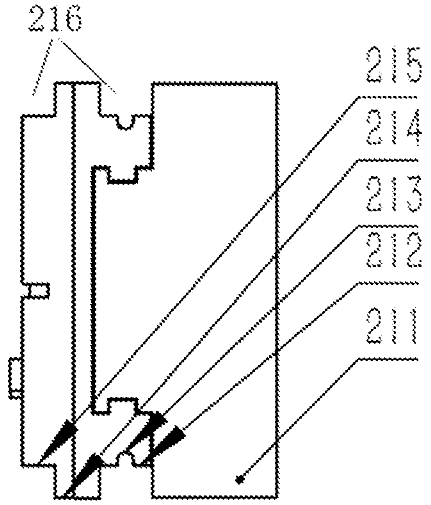
FIG. 8 is a top view of a threading block according to an embodiment of the present invention.
Figure 9:
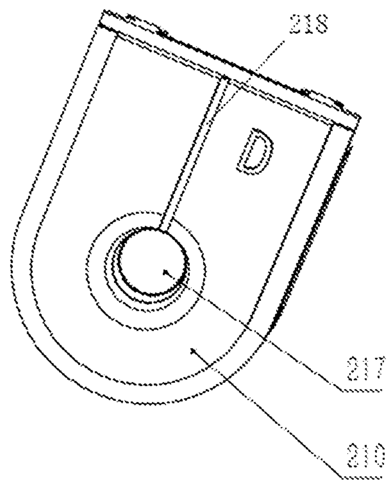
FIG. 9 is a structural diagram of a threading block according to an embodiment of the present invention.
Figure 10:
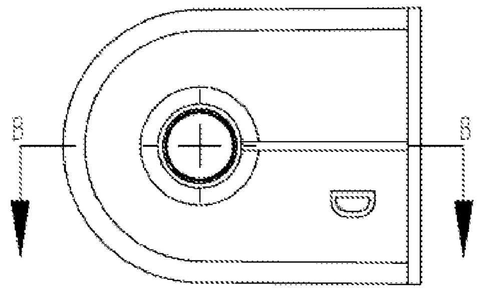
FIG. 10 is a structural diagram of a threading block according to an embodiment of the present invention.
Figure 11:
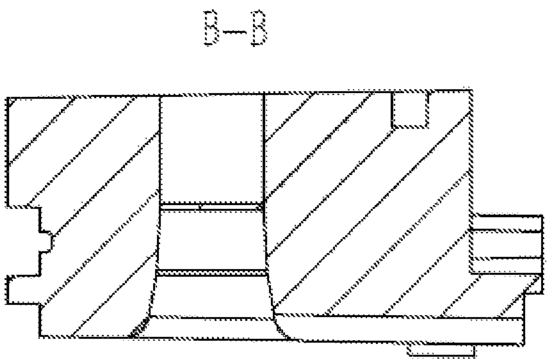
FIG. 11 is a sectional view of B-B in FIG. 10.

Moreover, in the present invention, the threading block 210 can be understood as follows. The threading block 210 is a multi-layer step structure, and the threading block 210 comprises a first step 211, a second step 212, a third step 214 and a fourth step 215 that are sequentially arranged along the axial direction of the optical fiber cabling hole 217, a width of the first step 211 is greater than a width of the second step 212, the width of the second step 212 is less than a width of the third step 214, the width of the third step 214 is greater than a width of the fourth step 215, the second step 212 and the fourth step 215 are both provided with the first positioning grooves 216, and the first positioning groove 216 located on the second step 212 is provided with the second positioning groove 213. The width of each step is defined as that a projection of each step in a horizontal plane comprises two edges parallel to a central axis of the optical fiber cabling hole, and a distance between the two edges is the width of each step. The horizontal plane is defined as a plane parallel to the central axis of the optical fiber cabling hole 217 and parallel to a bottom end surface of a box body, and the shape of the projection of each step in the horizontal plane is shown in FIG. 8. In the embodiment of the present invention, two first positioning grooves 216 are formed, and the first positioning groove 216 located on the second step 212 is provided with the second positioning groove 213.

Preferably, the shapes of the first step 211 and the third step 214 may be consistent, and the shapes of the second step 212 and the fourth step 215 may be consistent.

It can be understood that, in the present invention, the threading block 210 and the mounting groove 230 are of a tightly matched concave-convex structure, so that the threading block 210 can be completely attached to the mounting groove 230 without any gap, and the main base plate 110 can be completely isolated from the outside, thereby meeting the requirements of IP65 of the product in an optical communication industry, i.e., meeting the requirements of dust sealing (completely preventing foreign matters and dust from entering) and preventing the entry of sprayed water (preventing water sprayed from nozzles in various directions from entering the product and causing damage). In the present invention, the threading block 210 has five limiting guards on the main base plate 110, and after fixing by the pressing plate 410, the threading block 210 can be completely fixed on the main base plate 110. The pressing plate 410 is fixed to the main base plate 110 through two screws. The multi-layer concave-convex structure is a core inventive point of the threading block 210, which is not a conventional technical means for those skilled in the art, and it is just the structural design of the threading block 210 of the present invention that the waterproof performance of the box body of the present invention can be better ensured. In the present invention, four threading blocks 210 may be disposed on the box body.

Embodiment 2

An embodiment of the present invention mainly provides two use states of the threading block 210 in the optical fiber terminal box with high sealing performance.

Figure 12:
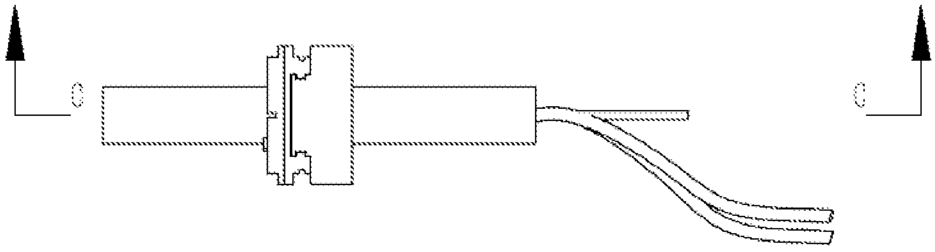
FIG. 12 is a schematic diagram of an optical fiber mounted on a threading block according to an embodiment of the present invention.
Figure 13:
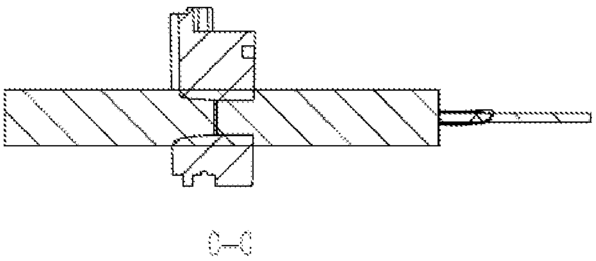
FIG. 13 is a sectional view of C-C in FIG. 12.
Figure 14:
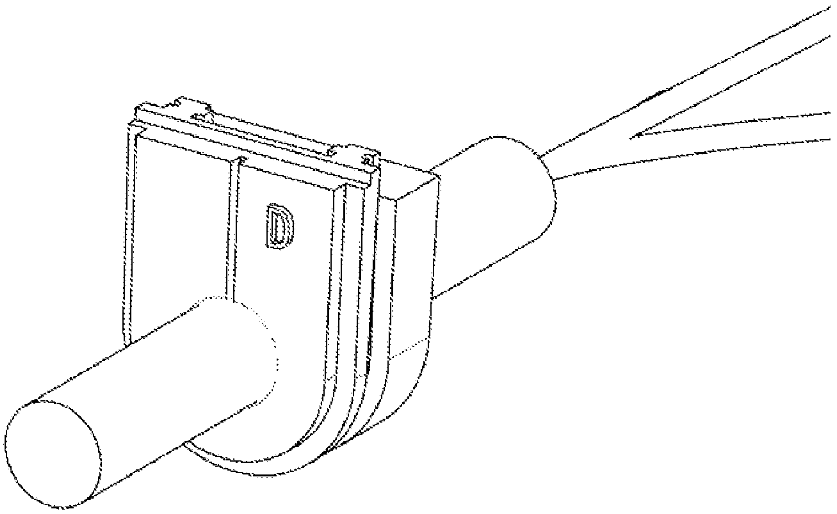
FIG. 14 is a schematic diagram of an optical fiber mounted on a threading block according to an embodiment of the present invention.

As shown in FIGS. 12 to 14, in the present invention, an initial state of the threading block 210 is a solid integral structure, i.e., there is no optical fiber cabling hole 217. That is, the optical fiber cabling hole 217 may not be machined in advance or may be machined in advance to be sealed by a plug (namely, the plug is detachably disposed in the optical fiber cabling hole 217, and a shape of the plug corresponds to a shape of the optical fiber cabling hole 217). The threading block 210 is integrally formed by a rubber plug, and an end surface of one side of the threading block 210 is provided with a notch feature 218 for forming the optical fiber cabling hole 217. The optical fiber cabling hole 217 on the threading block 210 is in a closed state when not in use, so that a bottom of the box body can be in a sealed state. When the threading block needs to be used, a sharp tool such as a knife needs to be used to cut the threading block 210 along a center line of the notch feature 218 to form the optical fiber cabling hole 217. After the optical cable that can be withstood by the rubber plug is placed in the optical fiber cabling hole 217 (a diameter between the largest diameter and the smallest diameter of the optical fiber cabling hole 217 can be withstood), the optical cable can be wrapped tightly. The rubber material is relatively soft, and this property enables the smaller end of the tapered hole of the rubber plug to wrap the optical cable, and enables a gap to be filled based on the deformation of the rubber plug (as shown in FIG. 13, the rubber actually involved will be squeezed outwards, so that there is no gap between the optical cable and a rubber plug hole), so as to meet the requirements of IP65. This rubber plug may also adapt to optical cables of smaller size due to the tapered design.

Preferably, the optical fiber cabling hole 217 is a tapered hole. After the optical cable that can be withstood by the rubber plug is placed in the tapered hole (a diameter between the largest diameter and the smallest diameter of the tapered hole can be withstood), the optical cable can be wrapped tightly. The rubber material is relatively soft, and this property enables the smaller end of the tapered hole of the rubber plug to wrap the optical cable, and enables a gap to be filled based on the deformation of the rubber plug.

Embodiment 3

Figure 15:
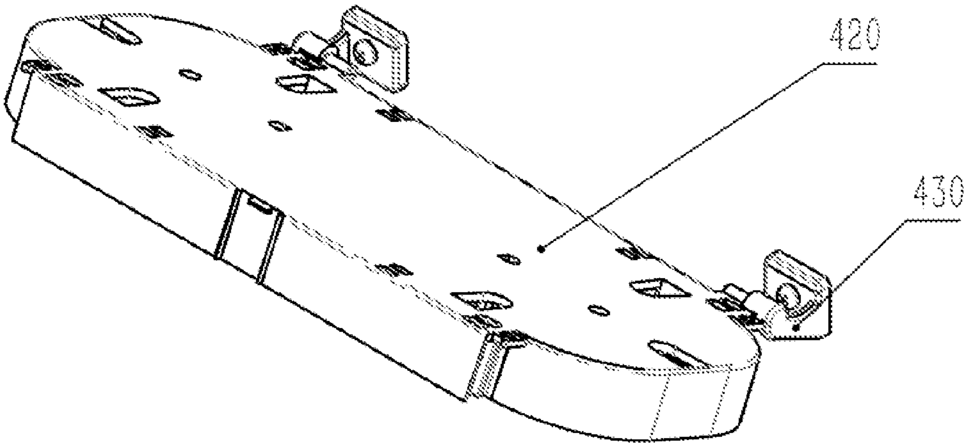
FIG. 15 is a schematic diagram of mounting of an optical fiber storage tray according to an embodiment of the present invention.
Figure 16:
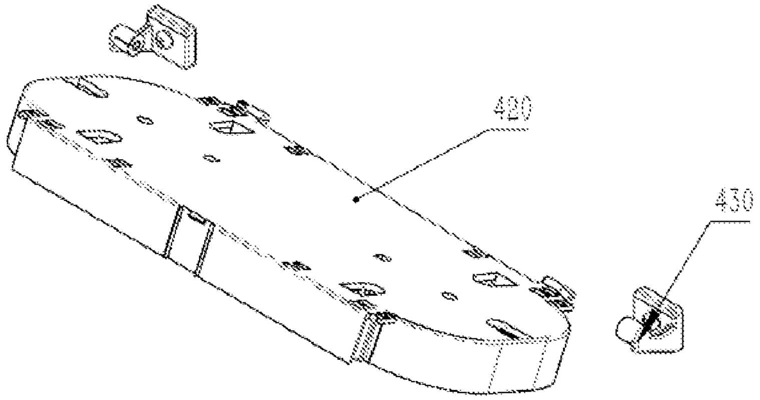
FIG. 16 is an exploded view of an optical fiber storage tray according to an embodiment of the present invention.
Figure 17:
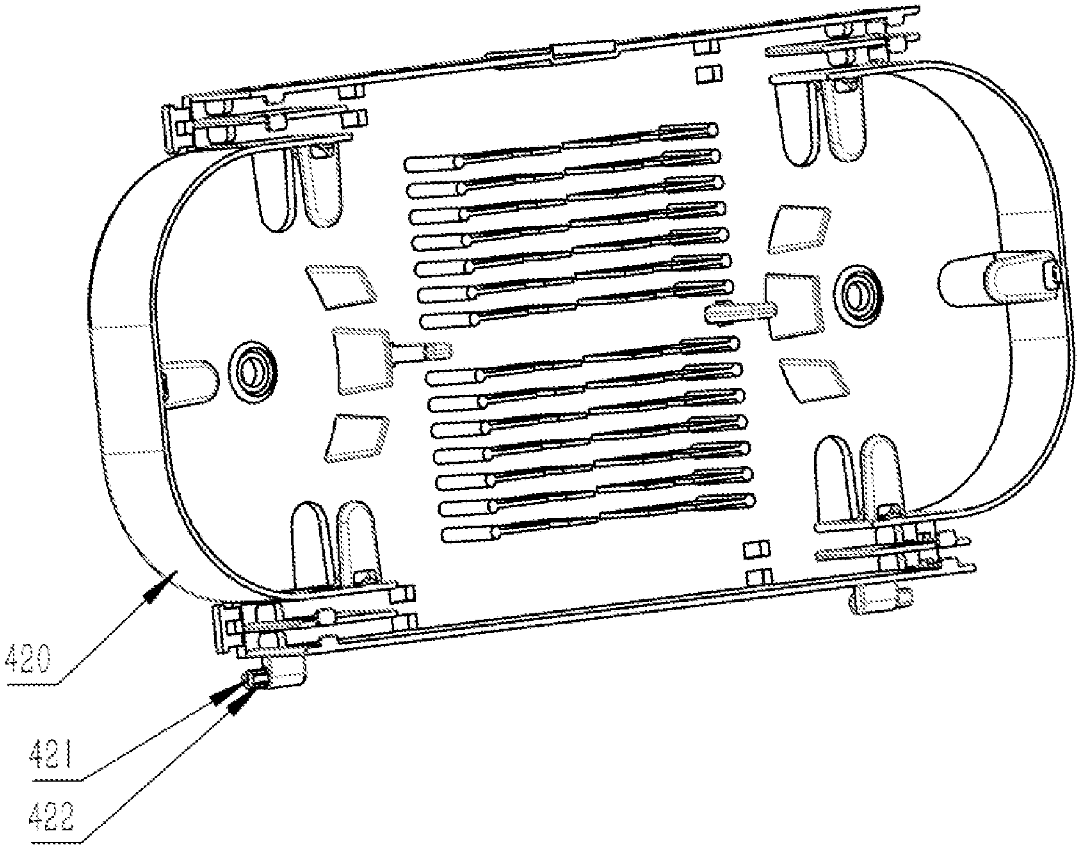
FIG. 17 is a schematic diagram of a rotating shaft on an optical fiber storage tray according to an embodiment of the present invention.
Figure 18:
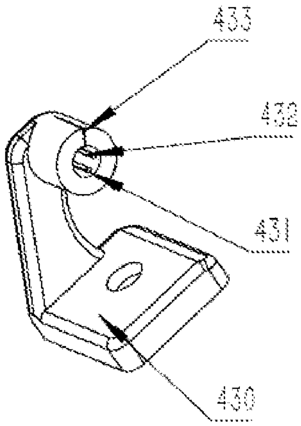
FIG. 18 is a schematic diagram of an optical fiber storage tray fixing bracket according to an embodiment of the present invention.
Figure 19:
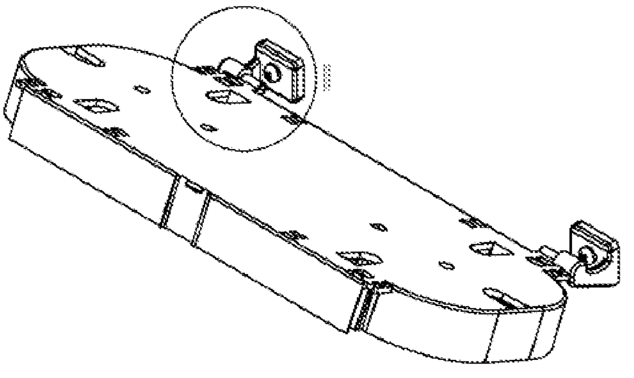
FIG. 19 is a schematic diagram of mounting of an optical fiber storage tray according to an embodiment of the present invention.
Figure 20:
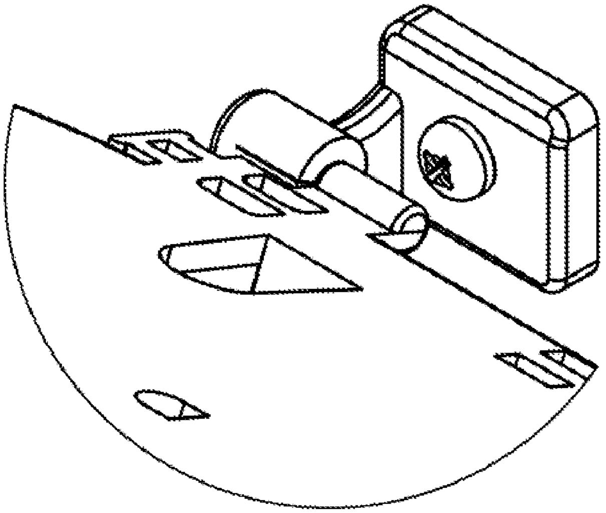
FIG. 20 is a partially enlarged view of II in FIG. 19.
Figure 21:
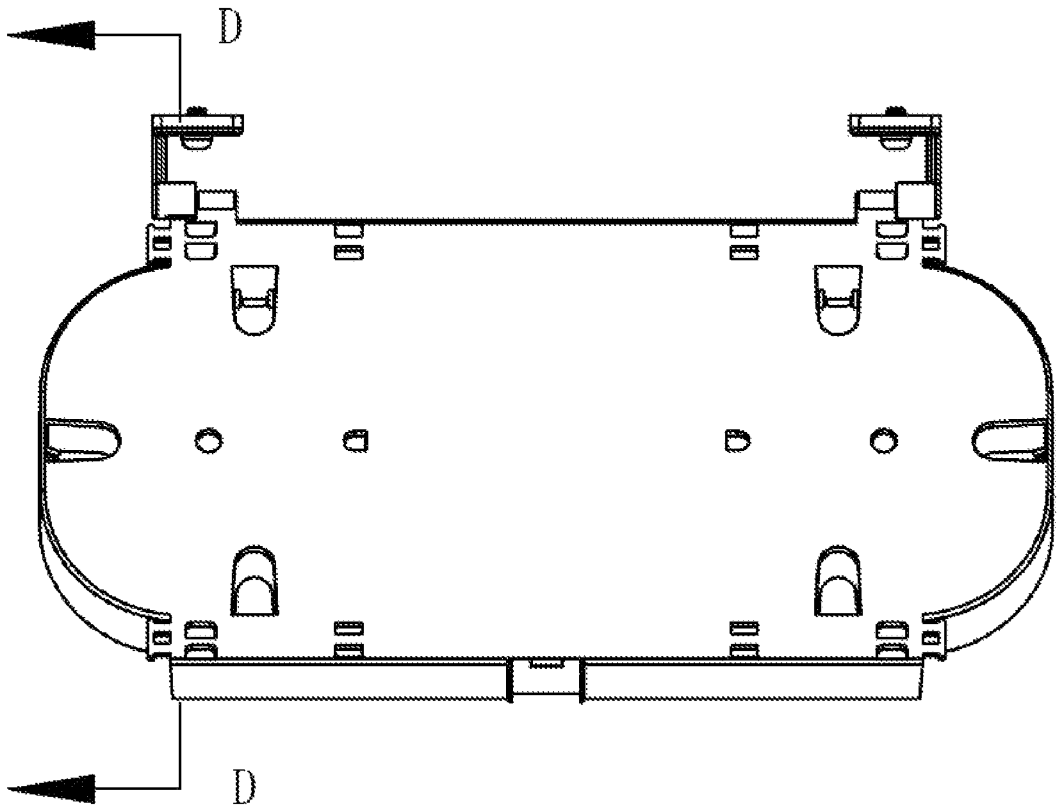
FIG. 21 is a schematic diagram of mounting of an optical fiber storage tray according to an embodiment of the present invention.
Figure 22:
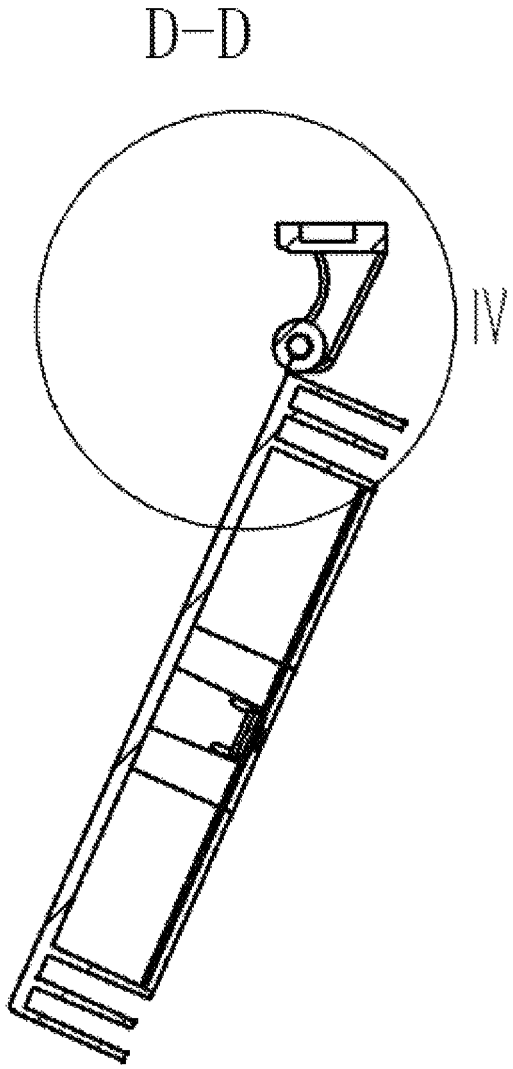
FIG. 22 is a sectional view of D-D in FIG. 21.
Figure 23:
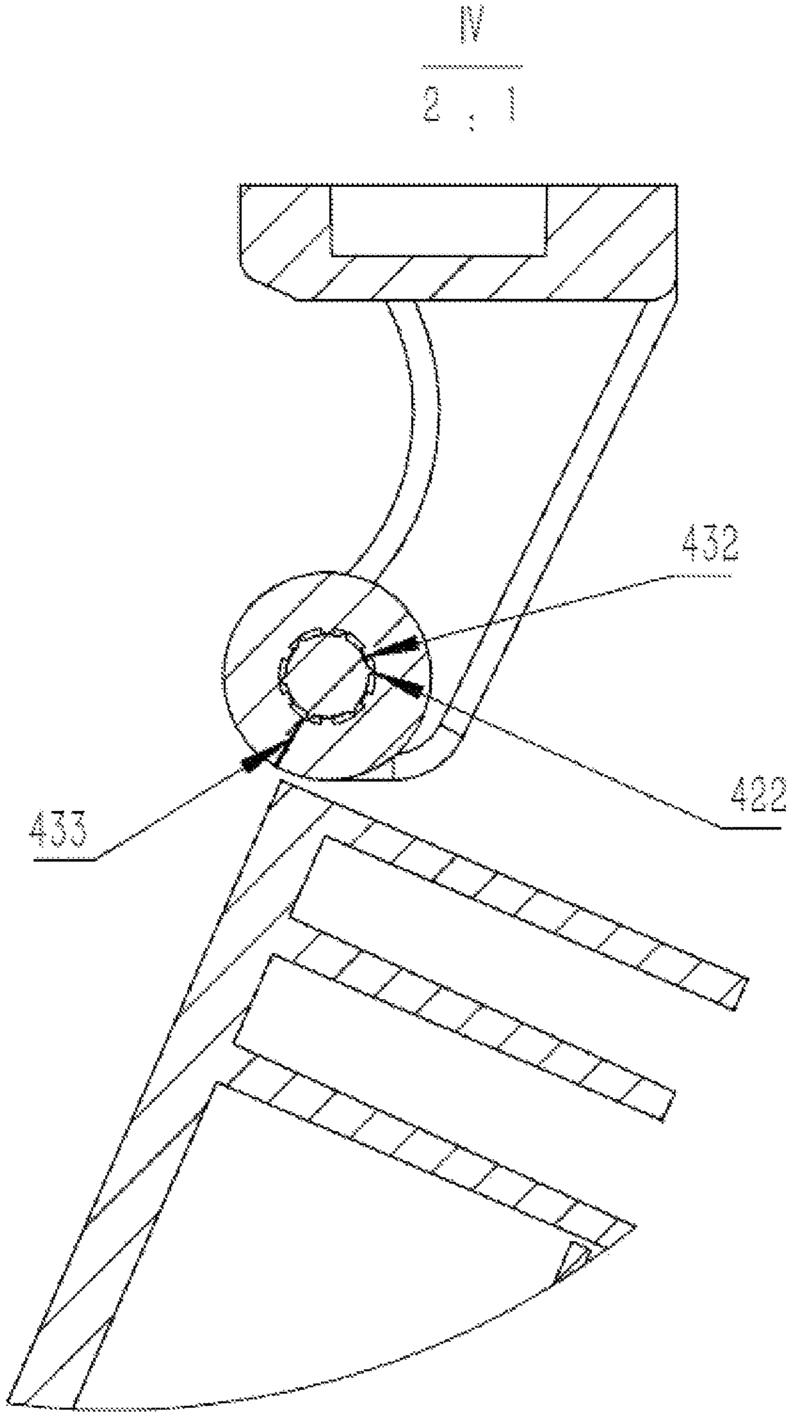
FIG. 23 is a partially enlarged view of IV in FIG. 22.

As shown in FIGS. 15 to 16, an embodiment of the present invention mainly provides a technical solution for hovering the optical fiber storage tray 420 in the optical fiber terminal box with high sealing performance.

In the prior art, a box body comprises a main base plate 110 and a box cover 130, the main base plate 110 is provided with a mounting groove 230, the box cover 130 is connected to the main base plate 110 through lock catches 480, an optical fiber storage tray 420 is hinged in the main base plate 110 through optical fiber storage tray fixing brackets 430, and hovering of the optical fiber storage tray 420 is generally achieved by a friction force when a shaft hole is in interference fit. Over time, when the interference fit fails due to friction of the fiber storage tray or a support shaft, the hovering function has failed, and long-term use can not be achieved. To solve the described problem, the present invention provides a new technical solution to ensure that the hovering structure of the optical fiber storage tray 420 is more durable.

Preferably, as shown in FIGS. 16-23, in the present invention, the optical fiber storage tray fixing bracket 430 comprises a supporting seat, the supporting seat is provided with a rotating shaft mounting inner hole 431, an inner circumferential surface of the rotating shaft mounting inner hole 431 is provided with a plurality of first stopping ribs 432 rotationally symmetrically disposed along a circumferential direction thereof and inwardly extending in a radial direction thereof, the optical fiber storage tray 420 is provided with rotating shafts 421, an outer circumferential surface of the rotating shaft 421 is provided with a plurality of second stopping ribs 422 rotationally symmetrically disposed along a circumferential direction thereof and outwardly extending in a radial direction thereof, an outer diameter of the second stopping rib 422 is less than a hole diameter of the rotating shaft mounting inner hole 431, a diameter of a circle tangent to the second stopping rib 422 is greater than a diameter of a circle tangent to the first stopping rib 432, and the rotating shaft mounting inner hole 431 is provided with an opening groove 433 extending along an axis thereof and penetrating in a radial direction.

It can be understood that, in the present invention, the optical fiber storage tray 420 forms a rotatable structure through the cooperating connection of the rotating shafts 421 and the rotating shaft mounting inner holes 431. In addition, the second stopping ribs 422 are disposed on the rotating shaft 421 and the first stopping ribs 432 are disposed on the rotating shaft mounting inner hole 431, the first stopping ribs 432 and the second stopping ribs 422 cooperate to form a rib hovering structure, thereby ensuring that the optical fiber storage tray 420 can hover at multiple angles when rotating.

When the optical fiber storage tray 420 rotates in the rotating shaft mounting inner holes 431 of the optical fiber storage tray fixing brackets 430, the second stopping ribs 422 and the first stopping ribs 432 touch together, and the optical fiber storage tray 420 can hover. When a certain external force continues to be applied artificially, the first stopping ribs 432 on the optical fiber storage tray rotating shaft will collide with the optical fiber storage tray fixing bracket 430 to open the opening groove 433. The hole diameter of the rotating shaft mounting inner hole 431 is enlarged, so that the first stopping ribs 432 are separated from the second stopping ribs 422, and the optical fiber storage tray 420 can continue to rotate. When the first stopping ribs 432 and the second stopping ribs 422 collide together again, a second stop may be formed, and in this way, a multi-angle hovering function is achieved. It can be understood that, in the present invention, the optical fiber storage tray fixing brackets 430 and the rotating shafts 421 are both formed by plastic materials, and the rigidity and plasticity of the plastic materials are mainly used herein.

The optical fiber terminal box with high sealing performance disclosed in the present invention is applicable to various optical fiber network distribution systems. A branch optical fiber and a household optical fiber of the optical fiber network distribution system are connected through the optical fiber terminal box.

It should be understood that those skilled in the art may make changes and variations based on the above description, and all these changes and variations shall fall within the protection scope of the appended claims of the present invention.

What is claimed is:

1. An optical fiber terminal box with high sealing performance, comprising a box body, wherein mounting grooves (230) are disposed on the box body, a threading block (210) is plugged into the mounting groove (230) in a cooperating manner, an open end of the mounting groove (230) is provided with a threading block pressing plate (410), and the threading block (210) is provided with an optical fiber cabling hole (217), wherein an outer circumferential surface of the threading block (210) is provided with at least two first positioning grooves (216) arranged at intervals along an axial direction of the optical fiber cabling hole (217), at least one second positioning groove (213) is disposed on a groove bottom surface of at least one of the first positioning grooves (216), an inner circumferential surface of the mounting groove (230) is provided with first positioning lug bosses (231), the first positioning lug bosses (231) and the first positioning grooves (216) are arranged in one-to-one correspondence, and at least one of the first positioning lug bosses (231) is provided with a second positioning lug boss (232) cooperating with the second positioning groove (213), wherein the threading block (210) is a multi-layer step structure, the threading block (210) comprises a first step (211), a second step (212), a third step (214), and a fourth step (215) that are sequentially arranged along the axial direction of the optical fiber cabling hole (217), a width of the first step (211) is greater than a width of the second step (212), the width of the second step (212) is less than a width of the third step (214), the width of the third step (214) is greater than a width of the fourth step (215), the second step (212) and the fourth step (215) are both provided with the first positioning grooves (216), and the first positioning groove (216) located on the second step (212) is provided with the second positioning groove (213).

2. The optical fiber terminal box with high sealing performance according to claim 1, wherein the first positioning grooves (216) and the first positioning lug bosses (231) are in interference fit, and the second positioning lug bosses (232) and the second positioning grooves (213) are in clearance fit.

3. The optical fiber terminal box with high sealing performance according to claim 1, wherein the optical fiber cabling hole (217) is a tapered hole.

4. The optical fiber terminal box with high sealing performance according to claim 1, wherein a plug is detachably disposed in the optical fiber cabling hole (217), and a shape of the plug corresponds to a shape of the optical fiber cabling hole (217).

5. The optical fiber terminal box with high sealing performance according to claim 1, wherein the box body comprises a main base plate (110) and a box cover (130), the main base plate (110) is provided with the mounting grooves (230), and an optical fiber storage tray (420) is hinged in the main base plate (110) through optical fiber storage tray fixing brackets (430).

6. An optical fiber network distribution system, comprising a branch optical fiber, a household optical fiber, and an optical fiber terminal box with high sealing performance according to claim 1, wherein the branch optical fiber is connected to the household optical fiber through the optical fiber terminal box.

7. An optical fiber terminal box with high sealing performance, comprising a box body, wherein mounting grooves (230) are disposed on the box body, a threading block (210) is plugged into the mounting groove (230) in a cooperating manner, an open end of the mounting groove (230) is provided with a threading block pressing plate (410), and the threading block (210) is provided with an optical fiber cabling hole (217), wherein an outer circumferential surface of the threading block (210) is provided with at least two first positioning grooves (216) arranged at intervals along an axial direction of the optical fiber cabling hole (217), at least one second positioning groove (213) is disposed on a groove bottom surface of at least one of the first positioning grooves (216), an inner circumferential surface of the mounting groove (230) is provided with first positioning lug bosses (231), the first positioning lug bosses (231) and the first positioning grooves (216) are arranged in one-to-one correspondence, and at least one of the first positioning lug bosses (231) is provided with a second positioning lug boss (232) cooperating with the second positioning groove (213), wherein the box body comprises a main base plate (110) and a box cover (130), the main base plate (110) is provided with the mounting grooves (230), and an optical fiber storage tray (420) is hinged in the main base plate (110) through optical fiber storage tray fixing brackets (430), and wherein the optical fiber storage tray fixing bracket (430) comprises a supporting seat, the supporting seat is provided with a rotating shaft mounting inner hole (431), an inner circumferential surface of the rotating shaft mounting inner hole (431) is provided with a plurality of first stopping ribs (432) rotationally symmetrically disposed along a circumferential direction thereof and inwardly extending in a radial direction thereof, the optical fiber storage tray (420) is provided with rotating shafts (421), an outer circumferential surface of the rotating shaft (421) is provided with a plurality of second stopping ribs (422) rotationally symmetrically disposed along a circumferential direction thereof and outwardly extending in a radial direction thereof, an outer diameter of the second stopping rib (422) is less than a hole diameter of the rotating shaft mounting inner hole (431), and a diameter of a circle tangent to the second stopping rib (422) is greater than a diameter of a circle tangent to the first stopping rib (432).

8. The optical fiber terminal box with high sealing performance according to claim 7, wherein the threading block (210) is a multi-layer step structure, the threading block (210) comprises a first step (211), a second step (212), a third step (214), and a fourth step (215) that are sequentially arranged along the axial direction of the optical fiber cabling hole (217), a width of the first step (211) is greater than a width of the second step (212), the width of the second step (212) is less than a width of the third step (214), the width of the third step (214) is greater than a width of the fourth step (215), the second step (212) and the fourth step (215) are both provided with the first positioning grooves (216), and the first positioning groove (216) located on the second step (212) is provided with the second positioning groove (213).

9. The optical fiber terminal box with high sealing performance according to claim 7, wherein the threading block (210) is an integrally formed rubber plug, and an end surface of one side of the threading block (210) is provided with a notch feature (218) for forming the optical fiber cabling hole (217).

10. The optical fiber terminal box with high sealing performance according to claim 7, wherein the rotating shaft mounting inner hole (431) is provided with an opening groove (433) extending along an axis thereof and penetrating in a radial direction.

* * * * *